Dec. 7, 1926.  1,609,422
K. R. OLOFSON
INDENTURING APPARATUS
Filed August 14, 1923
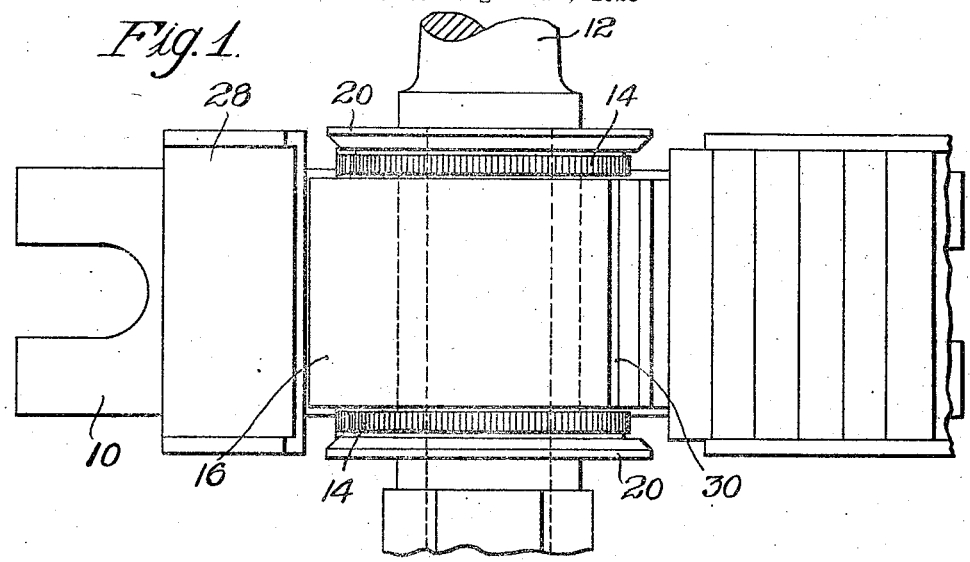
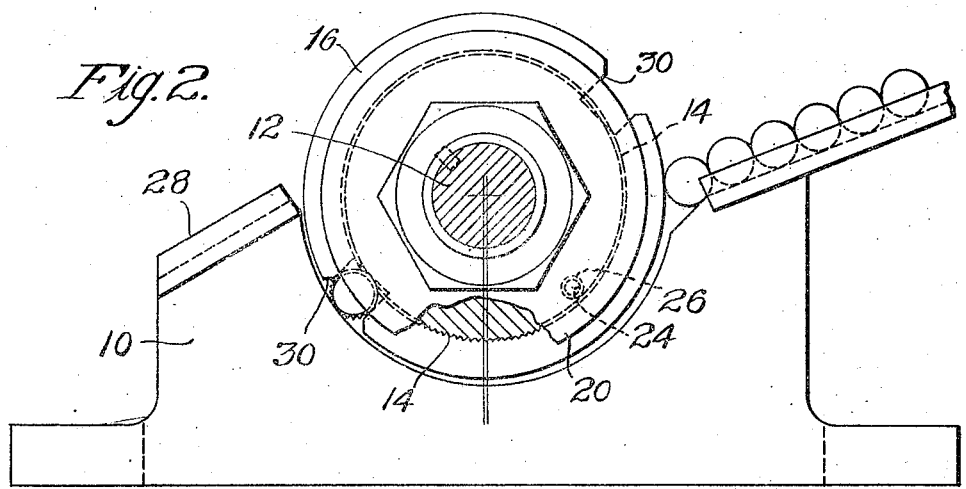
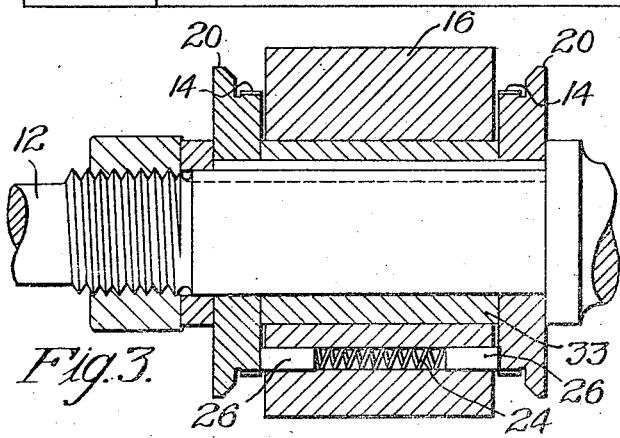
Inventor
Karl R. Olofson
by H. A. Pattison
Atty.

Patented Dec. 7, 1926.

1,609,422

UNITED STATES PATENT OFFICE.

KARL RICHARD OLOFSON, OF DORCHESTER, MASSACHUSETTS, ASSIGNOR TO WESTERN ELECTRIC COMPANY, INCORPORATED, OF NEW YORK, N. Y., A CORPORATION OF NEW YORK.

INDENTURING APPARATUS.

Application filed August 14, 1923. Serial No. 657,417.

This invention relates to indenturing apparatus, but more particularly to an indenturing apparatus in which an article to be indented is fed to and discharged from the indenturing member.

An object of the present invention is to improve and simplify an indenturing apparatus wherein a blank is fed to one side of, and discharged from the other side of the indenturing means.

Another object is to gradually increase the depth of indentures in an article.

A still further object of the invention is to provide an apparatus wherein a blank is fed to and discharged from a single indenturing member co-operating with a smooth surfaced member to provide indentures in the blank.

In order to attain these objects the invention may comprise a fixed member having a smooth concave arcuate surface presented to a rotatable blank carrier positioned upon an eccentrically mounted shaft and driven by friction means from indenturing dies fixed to the shaft to gradually advance a blank against the indenturing die.

These and other features of the invention not specifically mentioned will appear from the following description and the accompanying drawings, in which—

Figure 1 is a plan view of a machine embodying the invention and adapted to be used in combination with a milling machine;

Fig. 2 is a view in side elevation of the same, the arbor of the milling machine being broken away;

Fig. 3 shows a longitudinal section of the rotatable members of the machine mounted upon an arbor, and Fig. 4 shows side and end elevations of an article which has been indented by the machine.

Referring to the drawings in detail, a block 10, which may be of tempered steel, has in its upper surface an arcuate depression; and an arbor 12, which may be mounted on a milling machine (not shown) is offset horizontally from the axis of the arc of the depression in the base block about $\frac{1}{16}''$ toward the discharge end of the mechanism.

Loosely mounted upon a bushing 33 which is carried by this arbor is a metal cylinder 16, the radius of which is slightly less than that of the arc of the depression in the base block, in order that it may clear that member, and which has in its periphery depressions 30 parallel to its axis, and of a size to receive the blanks to be indented. This cylindrical member is mounted loosely so as to be free to rotate independently, and on either side of it are indenturing members 14, which are here shown as discs having serrated peripheries and guide flanges 20 for centering blanks during indenturing. These indenturing members are keyed to the shaft 12 so as to be driven by it, but have sufficient lateral clearance from the feed cylinder to allow it to rotate independently of these members. A spring 24, which is set in a hole drilled in the feed cylinder parallel to its axis, forces friction plugs 26 into contact with the inner sides of the indenturing members. This tends to carry the feed cylinder with the indenturing discs when the shaft 12 is rotated, but since the progress of the blank during indenturing is approximately one-half of the tangential speed of the periphery of the article, it is apparent that, since the blank is held by the feed cylinder while its periphery is gripped intermediate its ends between the indenturing members and the arcuate depression in the base block, that the feed cylinder must rotate at a different speed from that of the indenturing members, and a slippage will occur in the friction drive between these members and the feed cylinder during indenturing. The friction plugs drive the feed cylinder with sufficient force to carry a blank from the feed chute down to the indenturing members, but when the blank is seized by the teeth of the indenturing members, the above mentioned slippage occurs.

The radial clearance between the periphery of the indenturing members and the arcuate surface of the base, at the point where the blank is first seized, intermediate its ends between these parts, is just slightly less than the diameter of the blank to be indented. The axis of the indenturing members, being horizontally offset from that of the arcuate depression in the base block, brings these members closer to the discharge end of the arcuate surface than they are to the feed end, and the indenturing teeth will therefore sink deeper into the blank at every revolution until it is discharged, at the completion of the operation, into the take-off chute 28, where gravity carries it down into a suitable storage receptacle (not shown).

In setting the machine up for use, the base block 10 is first firmly secured to the bed of the milling or other suitable machine in a manner well known to the art, and one end of the arbor 12, containing the indenturing members and feed cylinder, is inserted in the spindle of a milling machine and made fast, while its other end is arranged to ride in a bearing in the head rest of the machine, in the well known manner of rotatable tools in such machines. The bed of the machine is then adjusted longitudinally and vertically, in the well known manner of such machines, to give the proper clearance between the base block and the indenturing members as previously described.

The apparatus is now ready for operation. A supply of blanks is placed in the feed chute, an auxiliary hopper to supply blanks to the feed chute may be used if desired, and the arbor 12 is caused to rotate by starting the milling machine. As a depression 30 in the feed cylinder presents itself to the bottommost blank in the chute, this blank is forced by gravity to enter the depression, and is carried down to the point where it is seized between the teeth of the indenturing members and the arcuate surface of the base member. Here the previously mentioned slippage of the friction feed drive takes place, and as the blank is rolled between the indenturing members and the base block, the teeth of the indenturing members sink continually deeper as the work progresses until the completed article is discharged onto the take-off slide.

What is claimed is:

1. In an indenturing machine, a fixed member having an arcuate surface, a rotatable member mounted eccentrically to said arcuate surface, and indenturing members having a driven connection with said rotatable member, said indenturing members positioned at opposite sides of said arcuate surface.

2. In an indenturing machine, a member having an arcuate surface, a rotatable member mounted eccentrically to said arcuate surface, and indenturing members having a driven connection with said rotatable member.

3. In an indenturing machine, a member having an arcuate surface, a rotatable member mounted eccentrically to said arcuate surface, and indenturing members having a frictional driven connection with said rotatable member.

4. In an indenturing machine, a fixed member having an arcuate surface, a rotatable member eccentric to said arcuate surface, indenturing members having a driven connection with said rotatable member, a feed cylinder with depressions in its periphery for guiding blanks during indenturing, and friction driving means connecting the feed cylinder and the indenturing members.

5. In an indenturing machine, a fixed member having an arcuate surface, a rotatable member eccentric to said arcuate surface, indenturing members with a flange extending radially from the periphery of each for centering blanks during indenturing, a cylindrical member mounted between said indenturing members and concentric therewith, having depressions in its periphery of a size to admit a blank, and friction driving means connecting said cylindrical member with said indenturing member.

6. In an indenturing machine, a fixed member with an arcuate surface, and a plurality of indenturing members mounted eccentric thereto, not diametrically opposite said arcuate surface, and having a minimum radial clearance therefrom equal to the diameter of an article to be indented, less the depth of the indentures.

7. In an indenturing machine, a member having an arcuate surface, a rotatable member mounted eccentrically to said arcuate surface, and indenturing members having a frictional drive connection with said rotatable member, said indenturing members positioned at opposite sides of said arcuate surface.

8. In an indenturing machine, a fixed member having a smooth arcuate surface, a rotatable member mounted eccentrically with respect to the arcuate surface and having a smooth walled depression in its periphery for supporting substantially the entire length of a cylindrical article to be indentured, an indenturing member positioned at one side of the arcuate surface, a frictional driving connection between the second mentioned and indenturing members, and means for rotating the second mentioned member to roll an article between the wall of the depression thereof and the arcuate surface and in engagement with the indenturing member.

In witness whereof, I hereunto subscribe my name this 27th day of July, A. D. 1923.

KARL RICHARD OLOFSON.